United States Patent [19]

Wu

[11] Patent Number: 5,172,607
[45] Date of Patent: Dec. 22, 1992

[54] DETACHABLE STEERING WHEEL FOR BURGLAR PROOF PURPOSE

[76] Inventor: Hsiang H. Wu, No. 49, Shang Chih Rd., Hualien, Taiwan

[21] Appl. No.: 800,983

[22] Filed: Dec. 2, 1991

[51] Int. Cl.[5] ............ B60R 25/02; G05G 5/00; F16D 1/00

[52] U.S. Cl. .................... 74/552; 70/209; 180/287; 403/299; 403/359; 403/362

[58] Field of Search ............ 74/552; 70/209, 237; 180/286, 287, 289; 403/299, 359, 362

[56] References Cited

U.S. PATENT DOCUMENTS

| | | | |
|---|---|---|---|
| 2,094,416 | 9/1937 | Sheffield | 403/299 X |
| 4,306,468 | 12/1981 | Bolgert | 402/299 X |
| 4,616,673 | 10/1986 | Bondar | 403/359 X |
| 4,624,596 | 11/1986 | Eckendorff | 74/552 X |
| 4,655,632 | 4/1987 | Smith | 403/362 |
| 4,662,775 | 5/1987 | Faul | 403/359 X |
| 4,881,389 | 11/1989 | Alfon et al. | 70/209 |
| 4,892,007 | 1/1990 | Haldric et al. | 74/552 |
| 4,901,544 | 2/1990 | Jang | 74/552 X |
| 4,938,094 | 7/1990 | Cochard | 74/552 |

FOREIGN PATENT DOCUMENTS 62-77280  4/1987  Japan .................... 74/552

Primary Examiner—Richard Lorence
Assistant Examiner—Julie A. Krolikowski
Attorney, Agent, or Firm—Bacon & Thomas

[57] ABSTRACT

A detachable steering wheel for burglar proof purpose comprises a steering column having a square hole in it, and a coupler on its upper end; a big nut placed around the coupler on the steering column, and retained thereto by a retainer ring to permit free rotation; a spindle having a front tip in the form of a square post for inserting into the square hole in the steering column, and fixing thereto by screws, a big threaded portion in its middle section for locking of the big nut, an intermediate threaded portion above the big threaded section, and a small threaded portion at the top section; a positioning sleeve having a screw hole for locking to the small threaded portion on the top of the spindle after fitting to the spindle; and a steering wheel with a detaching member in the middle and a positioning teethed cap, assembled so as the steering wheel can be detached and removed by loosening a screw fixing the steering wheel and the big nut as a preliminary burglar proof measure, and the spindle can be detached as removed by loosening screws locking its front tip as an advanced burglar proof measure.

7 Claims, 5 Drawing Sheets

DETACHABLE STEERING WHEEL FOR BURGLAR PROOF PURPOSE

BACKGROUND OF THE INVENTION

The present invention involves a car burglar proof measure, and it particularly relates to a detachable steering wheel assembly for burglar proofing a car.

Conventionally, electronic devices are used for burglar proofing a car. Such burglar proof devices tend to malfunction on many occasions, such as upon accidental shock by an animal or a person, and generate an unpleasant alarm noise, particularly during night time. Hence, there is a desire for improvement of such devices. Moreover, an electronic burglar proof device can be disarmed easily, such as by disconnecting its power source after opening the door, a procedure which can be completed within a few seconds. A car with such an electronic burglar proof device could be easily driven away after the warning signal is heard by the owner. Therefore, conventional burglar proof devices are not satisfactory.

SUMMARY OF THE INVENTION

In view of the above disadvantages of conventional burglar proof devices, the invention now provides a detachable steering wheel assembly for burglar proofing a car which permits first detaching the steering wheel as a preliminary burglar proof measure, and thereafter detaching the steering wheel spindle as an advanced burglar proof measure so that no one can start and drive away a car equipped with such a detachable steering wheel. The detachable wheel can be removed or installed within about a minute, and the use of which will not affect the structure of the steering system.

Another object of the present invention is to provide a detachable steering wheel which can be detached to increase the interior space of a car for the convenience of resting or sleeping therein.

BRIEF DESCRIPTION OF THE DRAWINGS

These and other objects and features of the invention will be become more apparent from the following detailed description thereof taken in conjunction with the accompanying drawings wherein.

DETAILED DESCRIPTION OF THE PREFERRED EMBODIMENT

Figure 1:
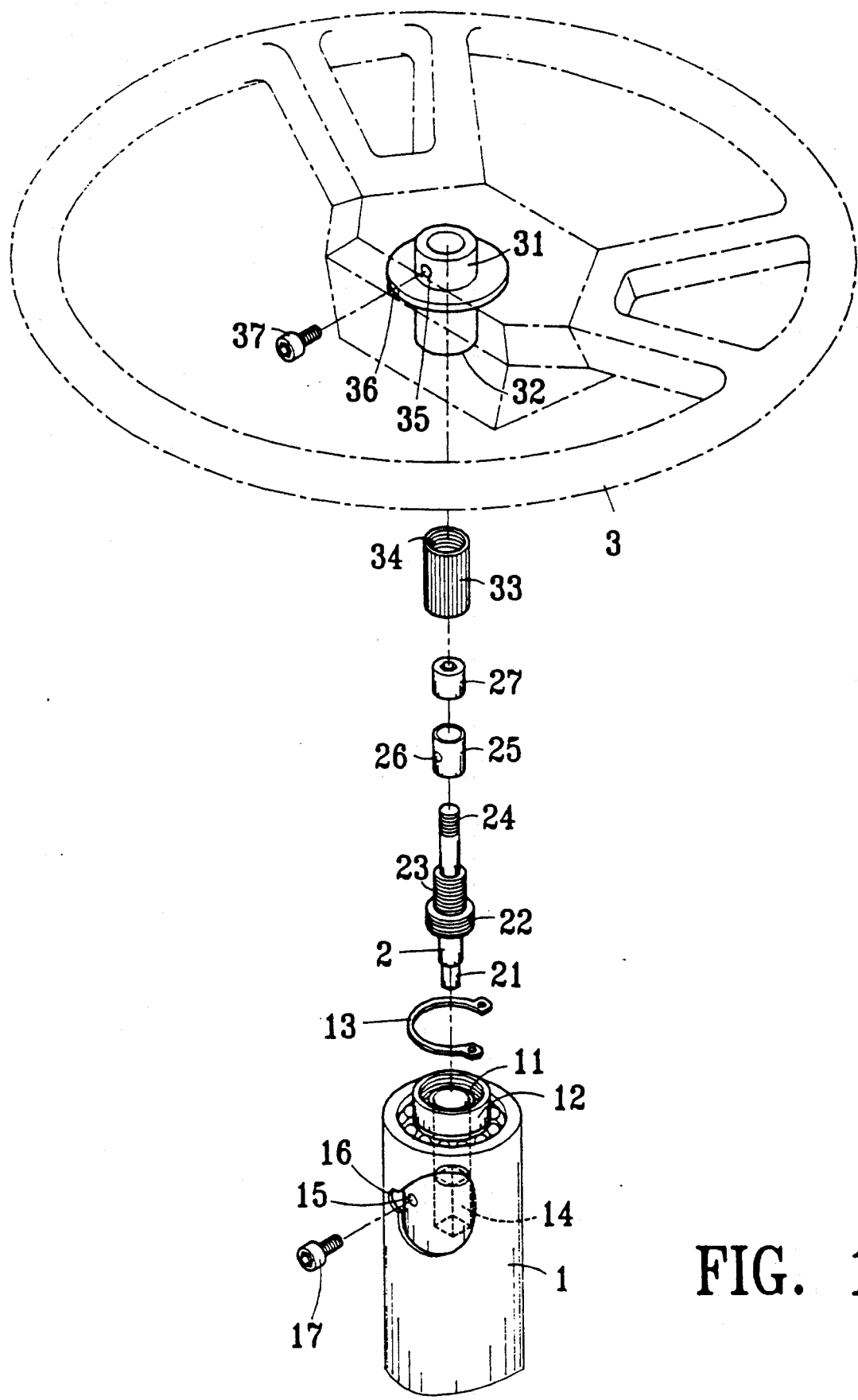
FIG. 1 is an exploded perspective view of a detachable steering wheel assembly according to the present invention.

Referring to FIG. 1, there is shown a perspective exploded view of a detachable steering wheel assembly according to the present invention. The assembly includes a steering column 1 for steering the car during driving. A longitudinally extending square hole 14 is provided inside steering column 1, and two aligned transversed screw holes 15 and 16 are provided through column 1 and communicating with square hole 14. On the upper end of column 1, there is provided a coupler 11 surrounded by large nut 12 which is retained to coupler 11 by a retainer ring 13 so that nut 12 can be freely rotated around coupler 11.

A spindle 2 includes a front tip 21 configured in the shape of a square post for inserting into square hole 14 in steering column 1, and fixed thereto by means of a screw 17 through screw holes 15 and 16 to prevent shaking caused by loose tolerance in assembly. The spindle 2 includes a large threaded portion 22 in its middle section for threaded engagement by large nut 12 to prevent disengagement of spindle 2 while the car is being driven. Above the large threaded portion 22 is an intermediate portion including a middle threaded portion 23 and a small threaded portion 24, the latter being at the upper end of spindle 2. A positioning sleeve 25 is disposed on spindle 2 and locked thereon by a small nut 27 in engagement with threaded portion 24.

Figure 2:
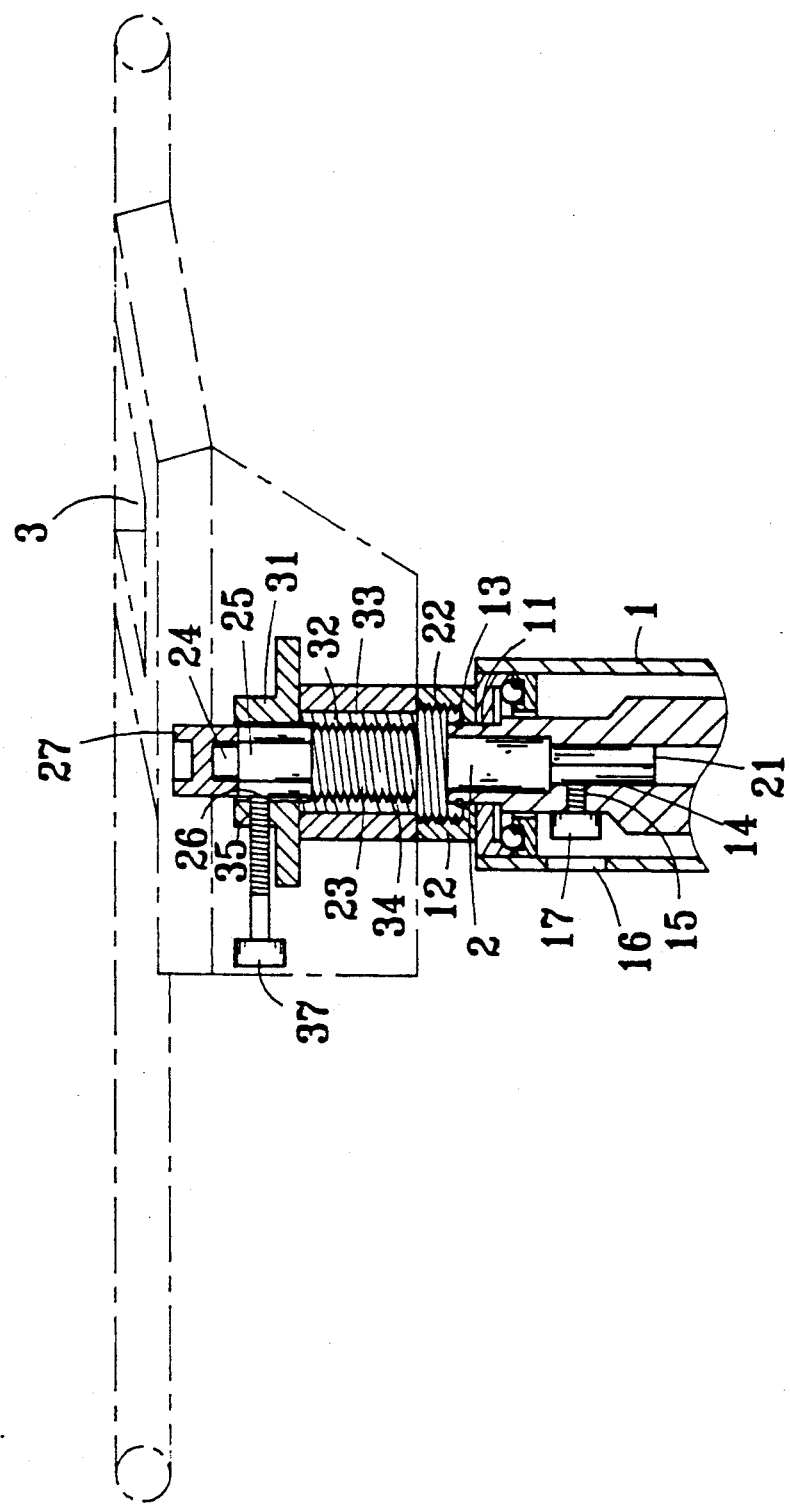
FIG. 2 is a cross-sectional view of the detachable steering wheel assembly.

A detaching member 31 is provided in the center of a steering wheel 3. A toothed portion 32 is provided around an inner wall of detaching member 31 for engagement to a correspondingly toothed positioning cap 33. A threaded portion 34 is formed on the inner wall of cap 33 for threaded engagement with the middle threaded portion 23 of spindle 2. A screw 37 extends through a screw hole 36 at the steering wheel 3, a screw hole 35 formed in detaching member 31 and a screw hole 26 formed through positioning sleeve 25 for securing detaching member 31 to positioning sleeve 25. This serves to firmly lock steering wheel 3 to positioning sleeve 25 and prevents removal of steering wheel 3 when the car is being driven. Assembly of the parts and components described above forms a detachable steering wheel for burglar proofing the car, as shown in FIG. 2.

Figure 3:
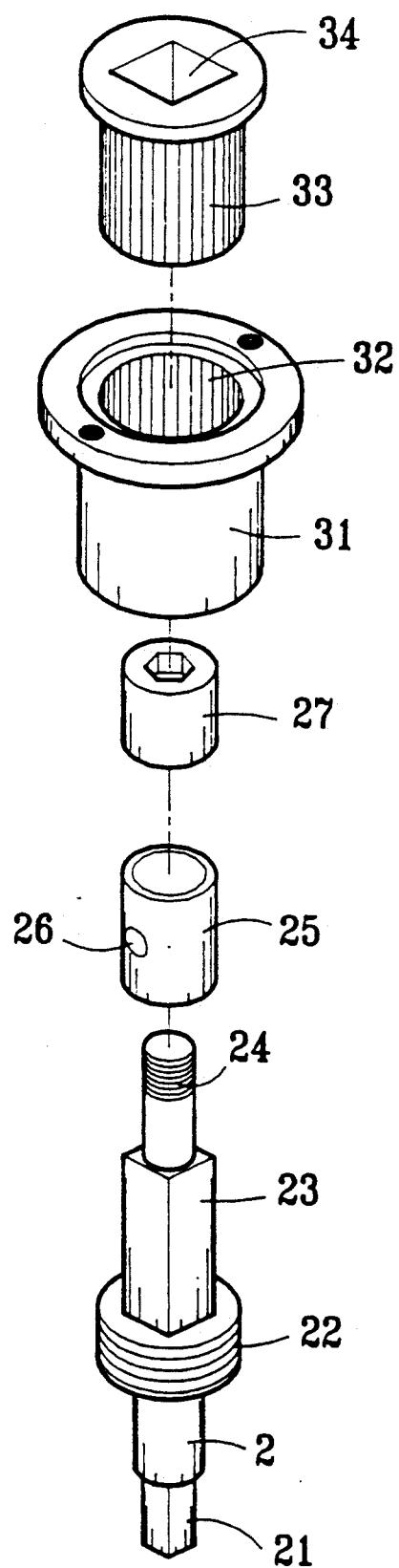
FIG. 3 is an exploded perspective view of another embodiment of a spindle for the detachable steering wheel assembly.

As seen in FIG. 3, there is shown another embodiment of the spindle 2 according to the present invention. In this embodiment, the front tip 21 of spindle 2 can be configured as a triangular post, a hexagonal post, a toothed post, a threaded post, or a post with any irregular cross section. The square hole 14 in steering column 1 can be formed in a configuration corresponding to the configuration of front tip 21 for receiving same therein. The intermediate portion 23 of spindle 2 can be formed with a square, triangular, hexagonal, toothed or other irregular cross section, and the inner wall of positioning cap 33 can be formed with a corresponding shape for engaging same.

Figure 4:
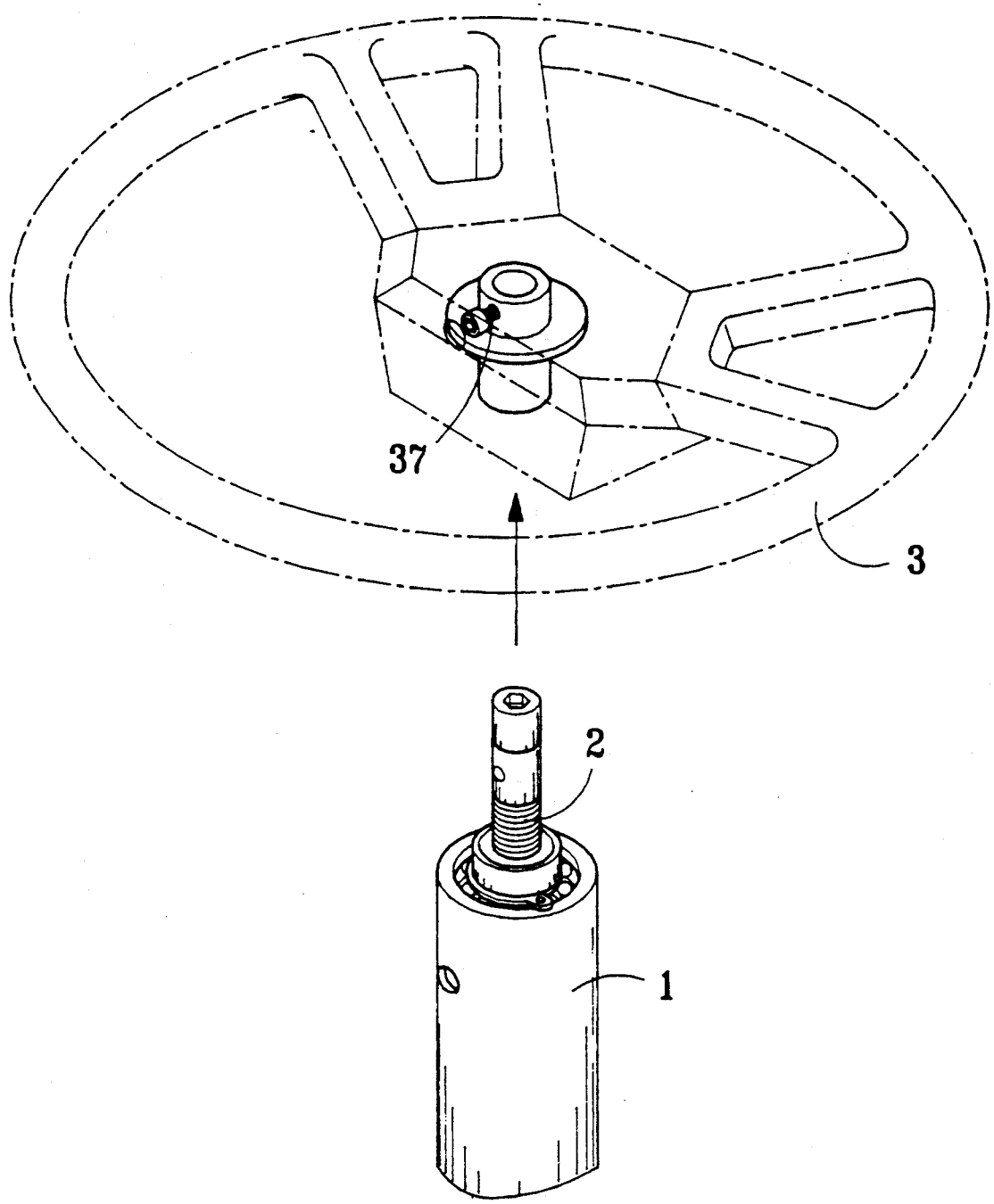
FIG. 4 is an exploded perspective view showing the detaching of the steering wheel from the spindle.
Figure 5:
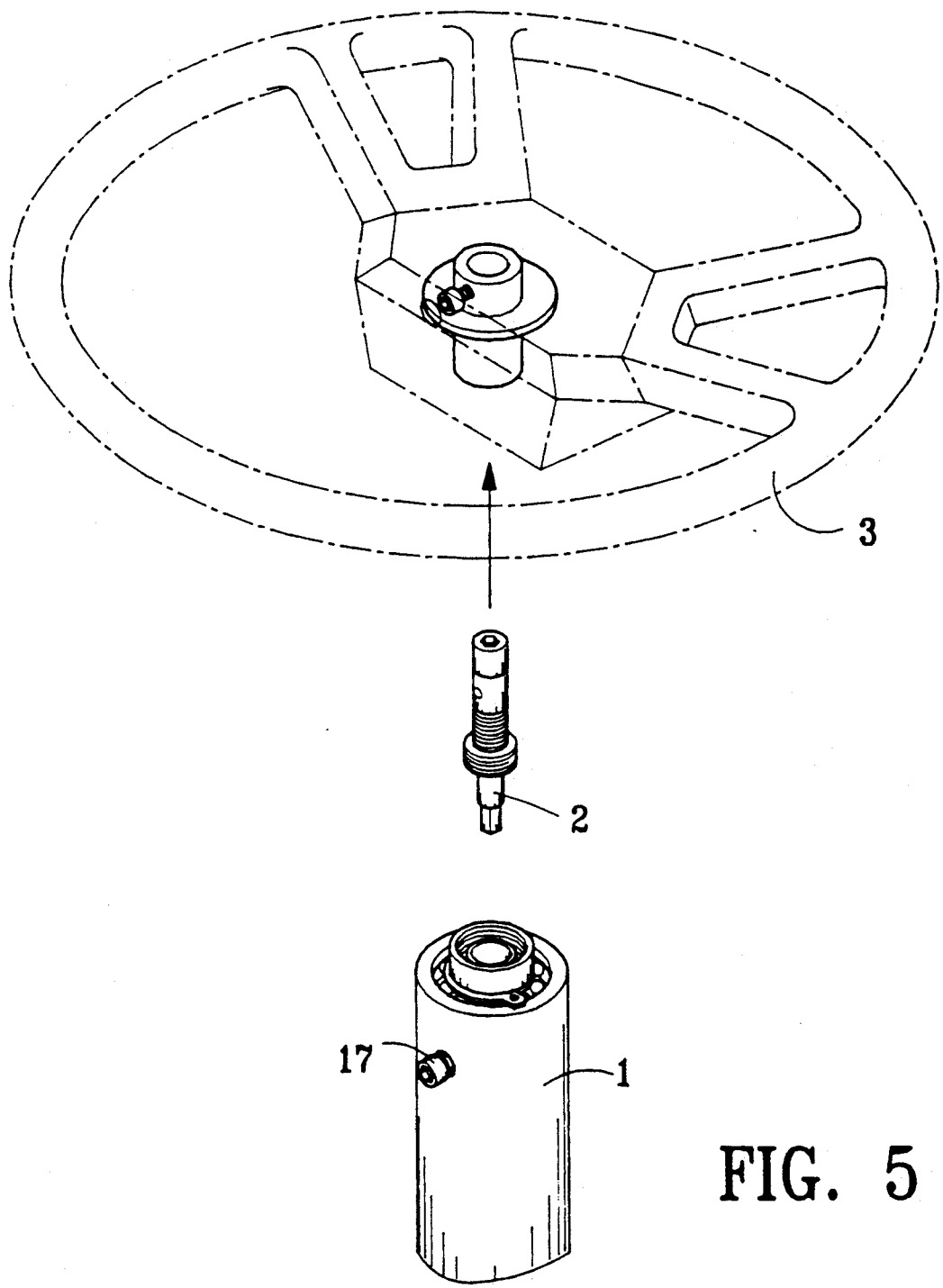
FIG. 5 is an exploded perspective view showing the detaching of the spindle from the steering column.

The manner of detaching steering wheel 3 from spindle 2 shall now be described with reference to FIG. 4. After parking a car equipped with the present invention, steering wheel 3 can be detached by turning after screw 37 has been loosened, thus providing a preliminary burglar proof measure. The manner of detaching spindle 2 from steering column 1 is shown in FIG. 5. This latter procedure is accomplished by loosening screw 17 and large nut 12, thus providing an advanced burglar proof measure. These measures prevent anyone from starting and driving the car away.

The present invention can also provide a psychological effect to stop any attempt to steal the car because a car without a steering wheel would be deemed to have broken down, and it would be quite difficult to drive it away. Anybody entering the car would not be able to start the engine because there is no steering wheel to turn before the engine can be started, a necessary step for starting the engine. Even if the engine is started, there is no steering wheel to steal the car. If a substitute steering wheel is made available, there is no spindle to secure it to the steering column, and it would be very difficult to obtain a substitute spindle. Hence, the present invention provides an ideal burglar proofing device for a car.

The front wheels of the car may be positioned by the invention. This is accomplished by first loosening small nut 27 to permit the positioning sleeve 25 to be turned into a desired position, which in turn positions the front wheels. Thereafter, positioning sleeve 25 is locked by tightening small nut 27 to complete the positioning procedure. For positioning of the steering wheel 3, the positioning cap 33 fixed to the detaching member 31 is first removed, and thereafter replaced in a desired position to secure steering wheel 3.

As described herein, the detachable steering wheel assembly according to the present invention serves as a mechanical type burglar proofing device. With installation of the invention, the steering wheel can be detached easily and taken away as a preliminary burglar proof measure, and even the spindle can be detached easily and taken away as an advanced burglar proof measure. Without the steering wheel and/or spindle, no one can start and drive the car away. The steering wheel and the spindle can be easily reassembled to permit driving of the car. It requires about one minute for complete detaching or reassembling of the steering wheel or spindle, and the structure of the steering system is not affected by the design of the invention.

Many changes and modifications in the above described embodiments of the invention may, of course, be carried out without departing from the scope hereof. Accordingly, the invention is disclosed to promote the progress in science and the useful arts and is intended to be limited only by the scope of the appended claims.

What is claimed is:

1. A detachable steering wheel assembly for burglar proofing a car comprising:
   a) a steering column including a longitudinal hole therein, at least one transverse hole extending from an outer surface of the column to the longitudinal hole, and a coupler on an upper end of the column;
   b) a first nut disposed around the coupler and a retainer ring retaining the nut for free rotation around the coupler;
   c) a spindle including a front tip having a configuration corresponding to the configuration of the longitudinal hole for insertion therein, a first threaded portion in a middle section thereof for threaded engagement with the first nut, an intermediate portion disposed above the first threaded portion, a second threaded portion positioned at a top section thereof, and a first screw disposable through the transverse screw hole for securing the spindle to the column;
   d) a positioning sleeve having a hollow center portion and a screw hole on the outer surface thereof, the positioning sleeve being disposable on the intermediate portion of the spindle between the first and the second threaded portions;
   e) a steering wheel having a detaching member in a middle portion thereof, the detaching member including a screw hole through an outer surface and a toothed portion around an inner cavity wall;
   f) a positioning toothed cap including an inner wall for engagement with the intermediate portion of the spindle and the toothed portion of the detaching member, the inner wall of the cap and the intermediate portion of the spindle including a corresponding engagement configuration, and a second screw insertable through the screw hole of the detaching member for detachably securing the steering wheel to the spindle; and
   g) wherein the steering wheel may be detached from the spindle by loosening the second screw and the first nut as a preliminary burglar proofing measure, and the spindle may be detached from the steering column by loosening the first screw as an advanced burglar proofing measure.

2. The detachable steering wheel assembly of claim 1 wherein the corresponding configuration of the longitudinal hole and the front tip of the spindle is substantially polygonal.

3. The detachable steering wheel assembly of claim 1 wherein the corresponding configuration of the longitudinal hole and the front tip of the spindle is substantially toothed.

4. The detachable steering wheel assembly of claim 1 wherein the corresponding configuration of the longitudinal hole and the front tip of the spindle is substantially irregular in cross section.

5. The detachable steering wheel assembly of claim 1 wherein the corresponding engagement configuration of the intermediate portion of the spindle and the inner wall of the positioning cap is substantially polygonal.

6. The detachable steering wheel assembly of claim 1 wherein the corresponding engagement configuration of the intermediate portion of the spindle and the inner wall of the positioning cap is substantially toothed.

7. The detachable steering wheel assembly of claim 1 wherein the corresponding engagement configuration of the intermediate portion of the spindle and the inner wall of the positioning cap is substantially irregular in cross section.

* * * * *